United States Patent
Chisholm

[15] 3,701,266
[45] Oct. 31, 1972

[54] METHOD OF TEMPERING GLASS IN A LIQUID
[72] Inventor: Raymond S. Chisholm, Pittsburgh, Pa.
[73] Assignee: PPG Industries, Inc., Pittsburgh, Pa.
[22] Filed: Jan. 10, 1972
[21] Appl. No.: 216,808

Related U.S. Application Data
[63] Continuation of Ser. No. 44,151, June 8, 1970, abandoned.

[52] U.S. Cl. .................................. 65/116, 65/104
[51] Int. Cl. ........................................ C03b 27/00
[58] Field of Search ..................... 65/104, 114, 116

[56] References Cited
UNITED STATES PATENTS
2,198,739   4/1940   Phillips ...................... 65/116
2,850,844   9/1958   White ....................... 65/104 X
3,186,816   6/1965   Wartenberg ................ 65/116

FOREIGN PATENTS OR APPLICATIONS
229,574   2/1944   Switzerland ................ 65/116

Primary Examiner—Arthur D. Kellogg
Attorney—Edward I. Mates

[57] ABSTRACT

Tempering a heated glass sheet or other glass articles by moving the sheet through a body of vapor and quenching in a liquid or liquid-vapor tempering medium maintained in a container. A condenser surrounds the upper portion of the container to provide the vapor body or barrier that inhibits rapid evaporation of the tempering medium and permits ready entry and removal of the glass sheet relative to the tempering medium. Several compositions having dense vapors and a boiling point above about 110° C. are suggested for the tempering medium.

11 Claims, 4 Drawing Figures

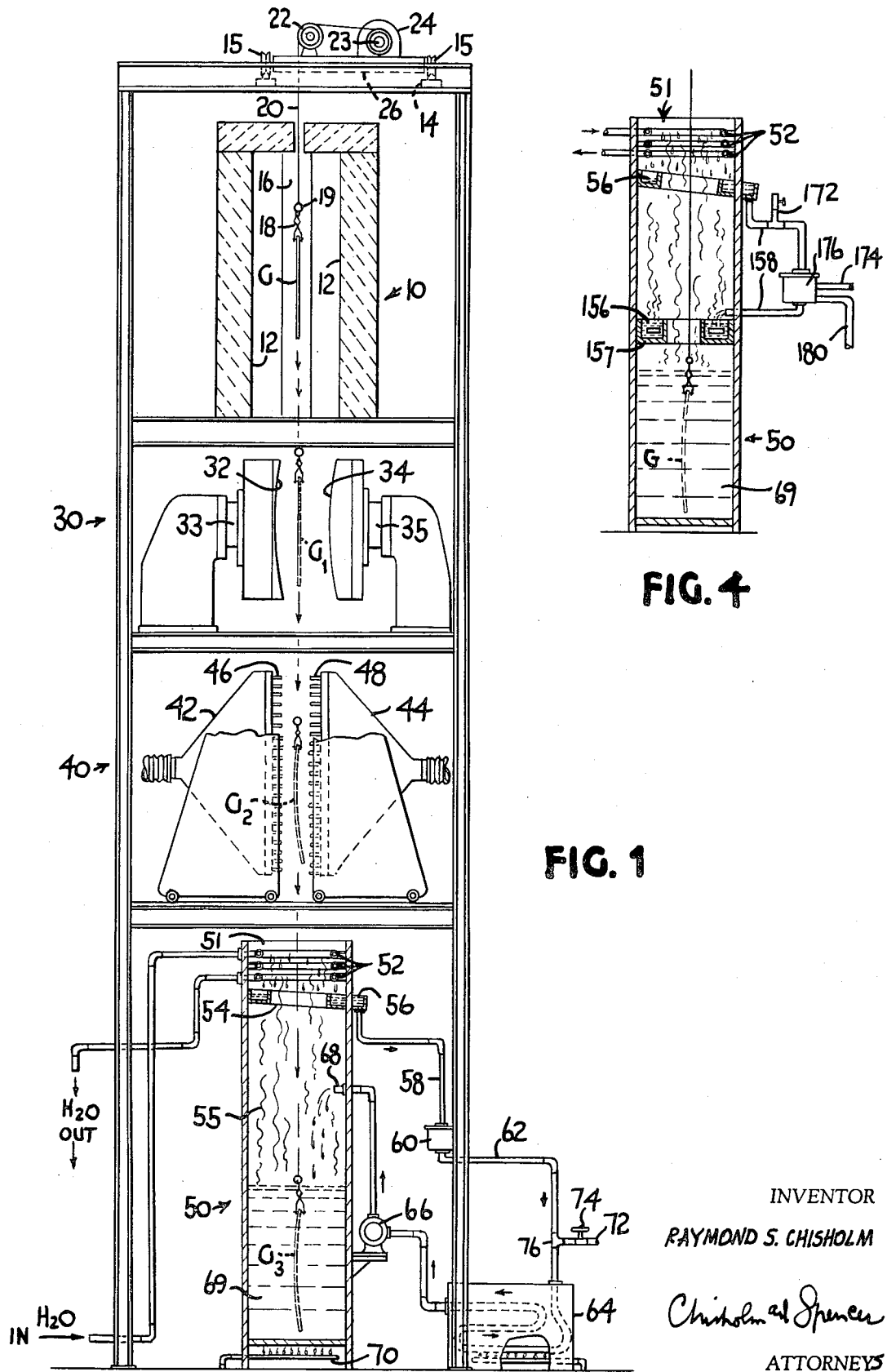

INVENTOR
RAYMOND S. CHISHOLM

BY

ATTORNEYS

METHOD OF TEMPERING GLASS IN A LIQUID

This is a continuation of application Ser. No. 44,151, filed June 8, 1970. now abandoned.

This invention relates to treating glass sheets, and particularly relates to the tempering of glass in sheet form, particularly thin glass sheets, although shaping and/or coating may be combined with the tempering. For the purposes of the present invention, thin glass is defined as glass having a nominal thickness of three-sixteenth inch and less.

Tempered glass is characterized by a skin or surface portion that is stressed in compression completely surrounding an interior core that is stressed in tension. In order to produce tempered glass, a glass sheet is first heated to a temperature well above its strain point, and approaching its softening point. The elevated temperature required for tempering generally is higher than the temperature needed to deform the glass sheet.

After the glass sheet has obtained a sufficiently high temperature, it is suddenly chilled by quenching. The essence of an effective tempering operation is to chill the glass so rapidly that its surface regions are cooled through the annealing range of the glass to its strain point where the surface becomes set while the temperature of the interior remains above the strain point and is still plastic. Thereafter the interior is cooled and the glass is brought to room temperature, thus establishing the desired stress relationship.

It is well known that the portions of the glass sheet that cool through the annealing range before other portions develop a compression stress whereas the other portions develop a tension stress when the entire glass sheet cools and remains permanently below the strain point. Since glass is notoriously strong when stressed in compression and weak (probably due to surface flaws) when stressed in tension, the glass skin stressed in compression provides a protective surface that causes the glass to be much stronger than untempered glass in its resistance to fracture. Another factor in rendering tempered glass safer then untempered glass is that tempered glass breaks up into very small fragments having smooth surfaces in the less frequent instances when it does fracture. These smoother particles of fractured tempered glass or "dice" are far less harmful to occupants of a vehicle than fractured untempered glass, which fractures more readily than tempered glass and, upon fracturing, produces pieces having jagged edges that are very dangerous.

In the past, requirements for automotive tempered glass has required glass of a nominal thickness of one-fourth inch. Glass of such thickness was relatively easy to temper by the quenching technique described above using cold air blasts to chill the hot glass, because the interior of the glass was sufficiently massive to retain a source of heat that retarded the cooling rate of the interior of the glass while the exterior was chilled to below the strain point. However, when the automotive designers started to require thinner glass for tempered glass window closures for the automobiles, it became more difficult to maintain a temperature gradient between the surfaces and the interior of the glass sheet undergoing tempering because there was less distance along which to establish an effective temperature difference between the surfaces and left a much smaller interior mass in which to store the interior heat.

One method proposed for tempering thin glass sheets involves use of liquid baths for chilling heated glass bodies in the production of tempered glass articles.

Liquid baths such as oils, alcohols, fats, waxes and certain chloro derivatives appear to have been investigated as chilling media in glass tempering processes. See, for example, South African Pat. Application 67/7724 of Wartenberg filed Dec. 8, 1967 and U.S. Pat. Nos. 3,186,861 to Wartenberg and No. 2,198,739 to Phillips. Many liquid media have but a limited field of useful application for tempering of glass. There is a difference in the inherent chilling severity of different liquids even among those of apparently similar nature. Experiments have shown that each liquid produces a different degree of temper in glass bodies of identical size, shape, and glass composition even though the temperature of the chilling baths are kept uniform and the temperature to which the glass bodies are heated prior to chilling is the same for all the articles.

This is due at least partly to the fact that the ability of any substance to absorb or transfer heat at a given temperature depends on the physical characteristics of the substance at that temperature, and substances rarely if ever have identical characteristics of thermal conductivity, heat transfer, boiling temperatures, specific gravity, viscosity, etc.

In Belgium Pat. No. 729,055 to Pilkington, a so-called two-stage quench is disclosed in which the glass surfaces are first hardened superficially by exposure to gas followed by severe cooling by immersing the glass so treated in a quenching liquid, such as oils and metals and metal alloys having a low boiling point.

According to the present invention glass in sheet or other form is tempered by moving hot glass, i.e., glass heated to a temperature at or above the tempering range, into a body of a dense vapor having, for example, a density of substantially in excess of and in most cases at least about three to four times the density of air and then exposing the hot glass to chilling contact with a stable liquid below the upper level of such vapor body and while the glass and the quenching area is shielded by the vapor body from the atmosphere. This contact may be achieved by immersing the glass into a body of the liquid used as the chilling liquid. Alternatively, sprays of jets of the chilling liquid may be projected against the glass surface while it is disposed in a gaseous phase in or below the body of vapor and below the top of said body. Thus, the glass is separated from the atmosphere by a body of the vapor while it is chilled by the liquid. The chilling liquid preferably has a boiling point above about 110° C.

Especially advantageous vapors are those of liquid aliphatic or cycloaliphatic chlorocarbon, including chlorohydrocarbons or chlorofluoro aliphatic or cycloaliphatic hydrocarbons which contain two to five carbon atoms, such as trichloroethylene, perchloroethylene, hexachlorobutadiene, hexachlorocyclopentadiene and trichlorotrifluorobutadiene, having the vapor density herein contemplated. Mixtures of two or more of such solvents may be used as well as mixtures of these solvents with other liquids.

For example, it is advantageous to make use of chilling liquids which comprise a lower boiling solvent and a higher boiling solvent, such as a chlorocarbon. In such a case, the lower boiling solvent vaporizes rapidly with considerable turbulence, thus promoting rapid heat transfer between the glass and the liquid while the higher boiling solvent remains at a temperature below its boiling point thereby preventing the liquid from overheating in the course of the quenching operation. Examples of such solvent mixtures include:

| | | |
|---|---|---|
| A. | Ethylene Dichloride | 10 – 50 parts by weight |
| | Perchloroethylene or Trichloroethylene | 90 –50 " " " |
| B. | Carbon Tetrachloride | 5 –50 " " " |
| | Perchloroethylene or Trichloroethylene | 95 –50 " " " |
| C. | Hexane | 5 – 40 " " " |
| | Perchloroethylene or Trichloroethylene | 95 – 60 " " " |
| D. | Hexachlorobutadiene | 10 – 75 " " " |
| | Ethylene Dichloride, Perchloroethylene or Trichloroethylene | 90 – 25 " " " |
| E. | Naphtha | 10 – 60 " " " |
| | Perchloroethylene or Trichloroethylene | 90 – 40 " " " |
| F. | Ethylene Dichloride | 15 – 40 " " " |
| | Perchloroethylene or Trichloroethylene | 75 – 30 " " " |
| | Hexane | 10 – 30 " " " |
| G | Perchloroethylene or Trichloroethylene | 25 – 90 " " " |
| | Mineral oil, boiling point at least 200°C. | 75 – 10 " " " |

The amount of chlorohydrocarbon or chlorofluorohydrocarbon in the vapor should be sufficient to render the vapor noninflammable or nearly so and, in general, it is in excess of 40 percent by weight of the vapor and preferably is composed of substantially all of one or more such materials. Since the hot glass is immersed in or is otherwise contacted with the chilling liquid, the composition of the vapor is controlled at least partially by the composition of the liquid.

Thus, when the liquid is wholly of a single chlorohydrocarbon, the vapor tends to be composed substantially wholly of such compound. Where the liquid is a mixture of two chlorohydrocarbons, the vapor composition depends upon the boiling characteristics of the liquid which may release as vapor an azeotrope of some of the components of the liquid or a vapor composed largely of the low boiling component.

The high density vapor desired is created by cooling the vapor at a point at the level of or above that where the quenching is effected. This is conveniently accomplished by means of cooling coils which are located at such level, and which effectively enclose the area where the glass is introduced into the quenching area, to cool the vapor to substantially its condensation point and maintaining a relatively thick, e.g., at least one inch and preferably 3 to 6 inches or more, bank or layer of the vapor in a region that forms a vapor barrier above the zone of quenching. Air circulation which tends to sweep the vapor away from the region or to seriously dilute the vapor is avoided.

While it is possible to temper by quenching in materials at room temperature when the materials have low chilling power H, for materials having a higher chilling power the container for the tempering medium may be heated directly or indirectly to heat its contents to approximately the boiling point of the tempering medium. This generates a zone of vapors above the liquid within the container. Alternately, rapid quenching of glass sheets may supply the heat required to maintain the liquid boiling.

The vapor barrier so formed readily permits immersion or removal of a heated glass sheet into the quench area, i.e., the vapor and/or liquid bath that exists below the vapor barrier. Vapor banks or barriers of the type herein contemplated have been used for degreasing metal parts, for example, as disclosed in U.S. Pat. No. 3,471,372 to Dunn.

The present invention is useful in any operation where glass is immersed in or otherwise contacted with a quenching liquid after being heated to a temperature sufficient for tempering and before its temperature cools to below the strain point of the glass. Hence, the glass may be shaped or coated and/or its surfaces preliminarily hardened by any of the prior art techniques, such as air or gas cooling or contact cooling with solids, between its heating and its chilling with liquid as herein contemplated.

In order to understand the present invention, several illustrative embodiments will be described.

DESCRIPTION OF ILLUSTRATIVE EMBODIMENTS

In the various drawings that form part of the illustrative embodiments of the present invention, and where like reference numerals refer to like structural elements, FIG. 1 is an elevational assembly view of apparatus for press bending and then tempering glass sheets by a two-step quenching, (forced air cooling followed by liquid cooling) in which the glass is moved vertically during its processing from a furnace and through several processing stations en route to a liquid quenching station embodying the teachings of the present invention;

FIG. 4 is a fragmentary schematic view of a tempering embodiment in which the material comprising the vapor barrier differs from the tempering medium.

Figure 3:
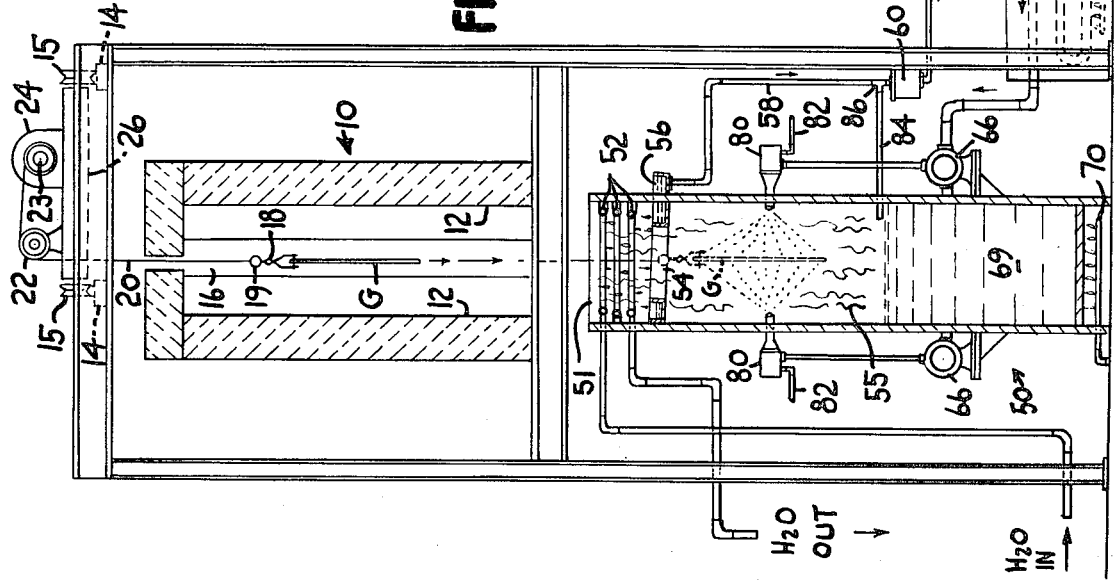
FIG. 3 is a view similar to that of FIG. 2 of an alternate embodiment of tempering apparatus in which the liquid tempering b medium is sprayed onto the glass surfaces.

Referring to the drawings, FIG. 1 shows apparatus for performing a vertically oriented process including a furnace 10 having heating elements 12 arranged along the opposite vertical walls thereof. A horizontal conveyor 14 comprising a pair of tracks 15 is mounted on the superstructure of the furnace for conveying flat glass sheets G into and out of the furnace through a slot type opening 16, which may be closed as desired using a sliding door (not shown).

One or more pairs of tongs 18 grip a glass sheet G near its upper edge when the glass undergoes processing. Each pair of tongs 18 is suspended from a horizontal bar 19 supported by cables 20, only one of which is shown. Each cable is entrained over a pulley 22 with its end portion wound around a drive shaft 23 of a reversible motor 24. The pulley 22 and motor 24 are mounted on a carriage 26 which is movable along the tracks 15 between a loading position offset from the furnace 10 and a glass processing position directly above the furnace 10. Vertical guides (not shown) may be employed to control the position of the ends of the bar 19 as the glass sheet moves vertically.

The heating elements 12 are arranged along the opposite walls of the furnace to face the major surfaces of the glass sheet G when the latter undergoes processing. Preferably, the heaters are arranged to provide hotter heat sources near the bottom of the furnace than near the top. This counteracts the natural convection current in the furnace and also permits the furnace to have a bottom opening, thus eliminating the need for a bottom door to permit vertical movement of a glass sheet through the floor of the furnace during processing.

A press bending station 30 is shown directly below the furnace 10 in vertical alignment therewith. The bending station comprises a pair of shaping molds 32 and 34 disposed on opposite sides of the vertical path taken by the glass sheet G. Shaping mold 32 is actuated by a piston 33, while shaping mold 34 is actuated by a piston 35. The molds are shown in their retracted position in FIG. 1 relative to a glass sheet (in phantom) aligned therebetween. The shaping molds have glass engaging surfaces that conform to the shape to be imparted to the heated glass sheet and preferably are of the type described and claimed in U. S. Pat. No. 3,367,764 to Seymour.

Below the press bending station is a forced air cooling station 40, where air under pressure is supplied through opposed plenum chambers 42 and 44 and directed through vertically spaced, horizontally extending slot openings 46 and 48 against the opposite surfaces of the bent glass sheets.

Directly below the forced air cooling station is a container 50 which is open at the top and which contains the tempering medium. The container is more than twice as high as the largest vertical dimension of glass sheets being processed and its open top would expose the tempering medium to the outer atmosphere were it not for the present invention.

According to the present invention, a vapor barrier 51 is provided at the upper portion of the container 50. To form this vapor barrier, the upper portion of the inner walls of the container 50 support cooling coils 52 that surround the vapor barrier 51. A cold fluid, such as water, is circulated through the cooling coils 52. This creates a cold zone having a temperature at or only a few degrees above the condensation point of the vapor. As is the case with vapor metal degreasing apparatus, vapors that rise from the body of tempering medium are cooled and collect in this cold zone. Some portion of that vapor condenses on the cooling coils 52. A trough 54 extending circumferentially slightly below the cooling coils collects the condensed vapors that would otherwise be lost by evaporation from a vapor layer 55.

The trough is tilted downward toward an exit opening 56 which leads to a pipe 58, a filter and trap 60 and another pipe 62. The latter follows a sinuous path through a heater 64 and a pump 66 to an inlet opening 68 in the wall of the container which may be below or above the level of the liquid tempering medium 69. An immersion heater diagrammatically illustrated at 70 is mounted in the lower portion of the container to control the temperature of the liquid tempering medium 69 where necessary. An addition feed pipe 72 controlled by a valve 74 may be used to replenish tempering liquid to the system through a T-connection 76 in pipe 62.

In a typical operation, a glass sheet G is attached to tongs 18 outside the furnace 10 with the tongs gripping the glass about one-fourth inch from its upper edge and carriage 26 is moved to a position directly over the vertically aligned apparatus. The heating elements are energized to raise the glass sheet temperature to about 1,200° to 1,250° F. When this temperature is reached, the reversing motor 24 is energized to lower the heated glass sheet into a position between the molds 32 and 34 and then to stop at a position shown in phantom at G–1.

Pistons 33 and 35 move the molds toward one another to engage the glass sheet G for about 2 seconds and then to retract the molds. The motor 24 is again energized to lower the press bent glass sheet G past the vertically spaced horizontal slot nozzles 46 and 48 while cold air flows through such nozzles. The glass is moved through the space between these nozzles at a constant speed sufficient to lower the glass surface temperature to about 1,000° to 1,050° F. without appreciably affecting the interior glass temperature as the glass sheet moves past the forced air cooling station 40. Care is taken to balance the velocity of the cooling air blasts to balance the pressure on opposite sides and thereby avoiding deflection of the glass in a lateral direction. The path of glass movement is approximately equidistant between the slot nozzles as depicted in the phantom position G–2.

It is understood that the above-mentioned heating, pressing and cooling stations or units are only diagrammatically illustrated since they involve conventional steps which may be varied widely in view of the art. While the stations are shown in vertical alignment it is also possible to resort to horizontally spaced stations or units. Further, the glass may be held essentially horizontal, for example, by passing on rolls or while suspended on rolls through an elongated heating furnace thence to a pressing station and past the cooling station.

The glass then moves through the vapor barrier zone 51 surrounded by the cooling coils 52 and continues through the vapor zone 55 into the lower portion of the container 50 where the liquid tempering medium 69 is located and remains in the liquid zone at position G–3 until the glass is cooled throughout its thickness to below its strain point, usually a matter of 2 to 30 seconds, depending on the chilling factor, of the liquid tempering medium. The glass sheet is then removed from the liquid bath by reversing motor 24 to lift the glass out of the container 50 and moving the carriage 26 to an accessible position, preferably at the loading station outside the furnace, where the press bent and tempered sheet is removed from the tongs and a new flat sheet engaged by the tongs to repeat the process. The speed of lowering is such that each glass increment is exposed for from 1 to 10 seconds en route to the liquid tempering medium from the press, depending on the thickness of the glass being processed.

Figure 2:
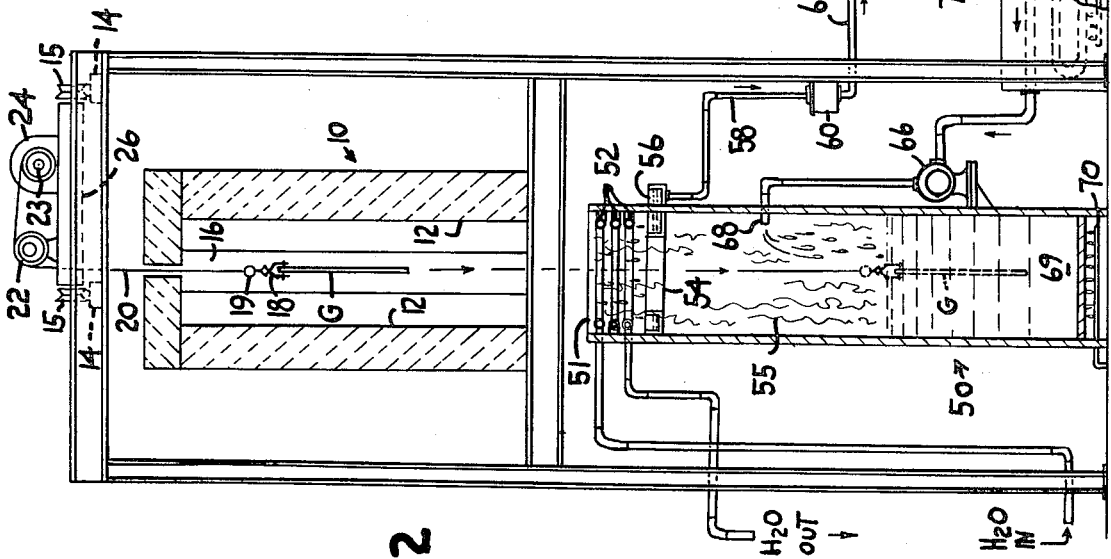
Fig. 2 is a view similar to that of FIG. 1 where the press bending step is omitted and the glass is moved directly from the furnace to a tempering embodiment of the present invention.

The apparatus diagrammatically depicted in FIG. 2 differs from that of FIG. 1 in the exclusion of the press bending station 30 and the forced air cooling station 40, although it is envisioned that either one of these stations may be included or omitted depending on the chilling power of the liquid tempering medium 69 used in the container 50 and the type of processing contemplated for the glass sheet. The heated glass sheet G is lowered through the vapor barrier 51 and the vapor layer 55 en route to the layer of tempering medium 69 at such a rate that the time of exposure for each incremental length of glass to the vapor barrier and the vapor is such that the glass is cooled superficially at its surfaces without affecting its interior temperature so that the glass is within a desired temperature range when it reaches the liquid tempering medium. A desired speed range for lowering the glass directly from the furnace to the liquid tempering medium is one that exposes each glass increment for from 1 to 10 seconds from the furnace 10 to the liquid tempering medium 69 depending on the chilling power of the latter.

In FIG. 3, provision is made for applying the tempering medium in the form of a spray against the major surfaces of the heat-softened glass sheet G as the glass sheet is supported in the vapor layer 55 above the liquid tempering medium but below the level of the vapor bank, i.e., the cooling coils. In this embodiment, spray guns 80 of the type disclosed in U. S. Pat. No. 2,715,046 to Ackerman are provided with means in their nozzles to adjust the distribution of the spray to insure that a uniform spray is imparted against the opposite major surfaces of the glass sheet and means to propel the spray at a controlled velocity toward the glass surfaces, which means is provided by an air pipe 82 to supply air under pressure to each spray gun. The nozzles and/or the glass sheet may be reciprocated to compensate for any variation in cooling pattern that results from playing a non-uniform spray against the glass in a manner well known in the art. If the size of the glass sheet requires, a battery of spray guns may be used to cover the entire surface with spray. An overflow pipe 84 connects to feed pipe 58 at a T-connection 86 to recirculate used spray material to the filter 60.

A common denominator of all three embodiments described is the use of condensing means in the form of the cooling coils 52 to delineate a vapor barrier 51 above a vapor zone 55 which is above a liquid tempering medium 69 in a container 50. Such a barrier separates the quenching zone, prevents entry of the quenching vapors into the heating zone, and prevents mixture accumulation in the quenching liquid. If water is condensed it is accumulated in the trough 56 and may be withdrawn from the upper portion thereof. Alternatively the line 58 may be provided with a separating chamber where the water may be allowed to separate and be drained off.

In selecting a material for the tempering medium, it is important that the material be considerably denser than air in the vapor state. Otherwise, the tempering medium will readily escape from the container and be difficult to contain within the vapor barrier enclosed within the condenser coils. The temperature of the liquid tempering medium should be above room temperature and not above the boiling point of the liquid.

In the above embodiments, the vapor barrier is formed by the vaporizing tempering medium which is vaporized either by quenching the hot glass or by adding external heat to the system. However, it is also advantageous to use a liquid tempering medium which is of a composition different from the liquid of the vapor barrier. Thus some liquids are very effective in producing a tempered product of high strength.

This embodiment is illustrated diagrammatically in FIG. 4 which shows container 50 with cooler pipes 52 and collector trough 56 for condensate of the vapor barrier as described above. Disposed below the trough 56 is a tray or compartment 156 extending along the interior walls of the container 50 and surrounding an open central area for introduction of the glass. This compartment is provided with suitable heating elements 157. Trough 56 is connected through line 158 to compartment 156. This line is provided with a line 172 to supply replacement liquid and draw off line 174, and also includes a separator 176.

In the operation of this embodiment a quenching liquid 69 is placed in the bottom of container 50. This liquid may, if desired, be held at its boiling point by external heating means (not shown). Alternatively, however, the liquid may be kept (by cooling coils not shown or by circulating the liquid through a cooling zone) below its boiling point particularly where the quenching liquid is a high boiling liquid such as those illustrated above.

The chlorohydrocarbon is introduced into the compartment 156 and is heated by heating elements 157 to vaporize the chlorohydrocarbon and to establish the vapor barrier. This vapor continues to condense as heretofore described and the condensate is collected in tray 56. The condensed liquid of the vapor barrier is withdrawn through line 158 and fed through the separator 176 to separate immiscible liquid such as water, or where the quenching liquid is immiscible to separate quenching liquid by gravity separation and draining off through line 180.

The separated liquid chlorocarbon is then returned to the vaporizing compartment 156. If desired, a portion or all of the separated condensate is withdrawn through 174 for distillation if necessary to separate quenching liquid from the chlorocarbon.

Glass is immersed in the quenching liquid and is tempered. Some portion of the quenching liquid is vaporized but is entrapped to a large degree by the vapor barrier and condensed. Such portion of such vapor as is not so entrapped is diluted with the chlorocarbon vapor which escapes from the system. Where the quenching liquid is itself inflammable, the presence of the vapor barrier reduces the danger of fire or explosion of the solvent in container 50 and, due to the relative noninflammability of the chlorocarbon, also reduces the likelihood of any escaping vapor from igniting.

The following experimental apparatus may be employed to compare the ability of various liquids to temper glass. Glass rods approximately 0.120 inch in diameter and 3 inches long having a knob at one end and a fire polished end at the other end are supported at the knob by a loop at the lower end of a wire. A vertical tube furnace having a constant temperature zone 4 inches long is oriented with its axis extending vertically over a tubular glass container 1.5 inches in diameter, 15 inches long holding 300 cubic centimeters of test fluid. Condenser tubes through which water flows surrounds the upper 2 inches of the container.

In a typical example, the glass rod is supported with a thin wire in the constant temperature zone of the furnace. The wire extends through a narrow opening at one end. The furnace is maintained with its constant temperature zone at 760° C. (1,400° F.). Each rod is held in the constant temperature zone for two minutes and then dropped into the tubular container of quenching liquid at room temperature (about 70° F.). After quenching, the rods are abraded by placing 10 quenched rods in a jar 2¾ inches in diameter and 5 inches high containing 200 cubic centimeters of 240 grit silicon carbide. The jar is rotated in a roller mill at 210 revolutions per minute for 15 minutes. The rods are then strength tested using 4 rods on a Riehle tester.

Table I shows the mean abraded strength in pounds per square inch for abraded samples tempered in various liquid tempering media.

TABLE I

Average Break Strength of Glass Tempered in Various Liquids

| Liquid Tempering Media | Mean Abraded Strength (psi) |
|---|---|
| Dow Corning 200 (dimethylpolysiloxane - viscosity 1000 centistokes at 25°C.) | 16,600 |
| Hexachloro-1,3-butadiene | 26,400 |
| GE 96–50 (dimethylpolysiloxane - viscosity 50 centistokes at 25°C.) | 25,700 |
| UC - 50-HB-400 (polyalkyline glycols-viscosity 150 centistokes at 25°C.) | 36,300 |
| UC 50-HB-260 (polyalkyline glycols-viscosity 56.2 centistokes at 100°F. | 42,000 |
| Carbowax 300 (polyethylene glycol-viscosity 5.8 centistokes at 210°F. | 48,100 |

It is also understood that many variations in materials for the liquid tempering medium may be made without departing from the spirit of the present invention which is recited in the claimed subject matter that follows. Although the present invention has been described with reference to the specific details of certain embodiments it is not intended that such details shall constitute limitations upon the scope of the invention except as included in the accompanying claims.

What is claimed is:

1. In the process of tempering glass by heating the glass to an elevated temperature sufficient for tempering in a heating zone and then contacting the heated glass with a quenching liquid capable of volatilizing in part when contacted with said heated glass in a quenching zone, thereby establishing a vapor zone of evaporated quenching liquid above the atmosphere of said quenching zone, an upper portion of said vapor zone being exposed to the outer atmosphere, the improvement which comprises establishing a cooling zone of liquefiable vapor at said upper portion of said vapor zone and cooling said liquefiable vapor in said cooling zone to condense said liquefiable vapor in said upper portion of said vapor zone to form a barrier of condensed vapor that prevents the escape of said vapor from said vapor zone to said outer atmosphere, recirculating at least a portion of said condensed vapor into said vapor zone below said barrier, and moving the glass through the barrier from said heating zone to said quenching zone.

2. The process of claim 1, wherein the liquefiable vapor is non-inflammable.

3. The process of claim 1, wherein the liquefiable vapor is at least three times as dense as air.

4. The process of claim 1, wherein the liquefiable vapor is heavier than air.

5. The process of claim 4, wherein the liquefiable vapor comprises a chlorocarbon.

6. The process of claim 1, wherein said vapor barrier is established by boiling a liquid chlorocarbon in a boiling zone and condensing at least part of the resulting vapors in an area above said boiling zone and between said heating zone and said quenching zone.

7. The process of claim 6, wherein the chlorocarbon is trichlorethylene.

8. The process of claim 6, wherein the chlorocarbon is perchlorethylene.

9. The process of claim 1, wherein the quenching liquid is different in composition from the liquid of said condensed barrier.

10. The process of claim 9, wherein the vapors of said quenching liquid are capable of igniting.

11. The improvement as in claim 1, wherein said condensed vapor in said condensed vapor barrier is of the same composition as that of said quenching liquid.

* * * * *